UNITED STATES PATENT OFFICE.

TURNER D. BOTTOM, OF NEW YORK, N. Y.

FILAMENT FOR INCANDESCENT ELECTRIC LAMPS.

SPECIFICATION forming part of Letters Patent No. 404,463, dated June 4, 1889.

Application filed September 29, 1888. Serial No. 286,778. (No specimens.)

*To all whom it may concern:*

Be it known that I, TURNER D. BOTTOM, a citizen of the United States, residing at New York, in the county of New York and State of New York, have invented certain new and useful Improvements in the Manufacture of Filaments for Electric Lamps; and I do hereby declare the following to be a full, clear, and exact description of the invention, such as will enable others skilled in the art to which it appertains to make and use the same.

This invention relates to the manufacture of filaments for incandescent electric lamps, and comprises the preparation and baking of the filament and its subsequent treatment for use as the light-giving portion of the lamp.

The invention consists in a filament partially or wholly composed of a molybdenum compound of a refractory character.

The invention further consists in the electric treatment of the filament for the purpose of standardizing the same in such manner as to effect the deposition or formation of molybdenum disulphide or artificial molybdenite. The compound which I prefer to use is the disulphide of molybdenum, which, as found in nature, is called "molybdenite." This compound may be readily produced artificially according to several processes.

Various methods may be adopted of carrying my invention into effect. As I prefer to use a compound filament composed of carbon and molybdic sulphide, I will describe the invention embodying such compound.

I may take molybdenum trioxide melted at a red heat and dip into this bath a filament of carbon or carbonaceous material. The filament so treated is then subjected to heat in the presence of vapor of hydrogen sulphide, which reduces the trioxide to molybdic sulphide, which is of a lead-gray color with metallic luster, is a conductor of electricity, but of high specific resistance, and under the circumstances of use as a filament in an exhausted globe is infusible and incombustible, and therefore well adapted to the purpose; or I may take molybdenum trioxide again and dissolve it in a hot concentrated solution of boric acid and dip the filament of carbon or other material into this bath. The dipped filament is then washed in alcohol, which precipitates the trioxide in the compound filamentary body, and finally, as in the previous instance, the dipped filament is subjected to heat in the presence of a vapor of hydrogen sulphide, the sulphur again uniting with the molybdenum to form the refractory molybdic sulphide; or molybdic sulphide or molybdenite may be dissolved in sulphide of ammonia and the filament soaked in this, after which it is treated to a bath of dilute nitric acid, the result being the formation of nitrate of ammonia and molybdic sulphide, the latter being deposited in and upon the filament, and the former being washed away in water bath.

Again, molybdenum trioxide may be dissolved in nitric acid or aqua regia, and with the solution thus formed the filament is impregnated. By subjecting this filament then to the action of hydrogen-sulphide vapor, molybdic sulphide is precipitated, as before.

The molybdic sulphide may be obtained in a variety of ways known to the chemist, and I therefore do not confine myself to any particular method of obtaining the same or of incorporating it as a portion of a compound filament. I prefer, however, to proceed as stated—namely, to take the filament of already baked carbon.

It may be well to state that the artificial molybdenite may also be produced electrolytically. In proceeding on this basis I would take a salt of the metal—such as the nitrate, chloride, or cyanide, or other salt of molybdenum—dissolve the same in water, and use it as electrolyte, the previously-baked carbon filament forming the cathode. Under the action of the electric current molybdenum is deposited on the carbon, and when sufficiently coated the filament is removed and electrically heated by passing a current through it in a rarefied atmosphere of hydrogen sulphide and the process continued until the required resistance has been arrived at in the filament, the action of the hydrogen sulphide being as above stated—namely, the formation of artificial molybdenite. This formation, by reason of the gradual electric heating of the filament in the presence of the rarefied vapor of hydrogen sulphide, is exceedingly dense in character and completely covers all portions of the internal structure of carbon, and therefore protects the same against combustion in a partial vacuum. The process may be continued to any desired extent.

As a modification of the foregoing electrolytic process followed by electric heating, the final result of molybdic sulphide may be arrived at directly by electrolysis by preparing a solution of molybdenum in ammonium sulphide or a solution containing sulphur and the salt of molybdenum. The filament is placed in this solution as the cathode, and the action of the current is the direct formation on the filament of molybdic sulphide.

It will be observed that in all the foregoing modifications the final result aimed at is the same—namely, the formation in or upon the filament of molybdic sulphide, which I have found to be peculiarly adapted to the purpose, owing to its qualities of infusibility, incombustibility, and high specific resistance. The various processes described for its production lend themselves readily to the manufacture of filaments for incandescent electric lamps, and the result is that I can produce a filament which will permit a long life under conditions of high electrical efficiency with regard to the amount of electrical energy required for a given candle-power.

What I claim as my invention is as follows:

1. The process of manufacturing filaments, consisting of forming a deposit of molybdenum compound in or upon a suitable filamentary body.

2. The process of manufacturing filaments, consisting in submitting a suitable filamentary body to a bath of a molybdenum compound, then changing such compound to molybdic sulphide, substantially as described.

3. The process of manufacturing filaments, consisting in incorporating a suitable filamentary body with oxide of molybdenum and then heating the same in the vapor of a sulphur compound, whereby the oxide is transformed into sulphide.

4. The process of manufacturing filaments, consisting in incorporating a suitable filamentary body with oxide of molybdenum and then electrically heating the same in the vapor of a sulphur compound, substantially as described.

5. The process of manufacturing filaments, consisting in incorporating a suitable filamentary body with oxide of molybdenum and then electrically heating the same in a rarefied vapor of a sulphur compound.

6. The process of manufacturing filaments, consisting in incorporating a suitable filamentary body with oxide of molybdenum and then electrically heating the same in the vapor of a compound of sulphur and hydrogen.

In testimony whereof I affix my signature in presence of two witnesses.

TURNER D. BOTTOM.

Witnesses:
W. L. CANDEE,
T. J. McTIGHE.